United States Patent
Kraemer et al.

(10) Patent No.: US 6,880,312 B2
(45) Date of Patent: Apr. 19, 2005

(54) PROCESS FOR DELIVERING A COLD OR HEAT STORAGE MEDIUM INTO A CARRIER MATERIAL

(75) Inventors: Wolfgang Kraemer, Munich (DE); Robert Lang, Munich (DE); Kemal-Edip Yildirim, Stockdorf (DE)

(73) Assignee: Webasto Thermosysteme International GmbH, Stockdorf (DE)

( * ) Notice: Subject to any disclaimer, the term of this patent is extended or adjusted under 35 U.S.C. 154(b) by 0 days.

(21) Appl. No.: 10/621,319

(22) Filed: Jul. 18, 2003

(65) Prior Publication Data

US 2004/0045260 A1 Mar. 11, 2004

(30) Foreign Application Priority Data

Sep. 11, 2002 (DE) .......................................... 102 42 077

(51) Int. Cl.[7] .............................................. B65B 31/06
(52) U.S. Cl. ............................. 53/434; 53/431; 53/432
(58) Field of Search ....................... 53/428, 431, 432, 53/434, 463, 440, 467, 469, 111 R, 510, 512

(56) References Cited

U.S. PATENT DOCUMENTS

| | | | | |
|---|---|---|---|---|
| 2,566,533 A | * | 9/1951 | Poux ............................ | 53/452 |
| 2,613,487 A | * | 10/1952 | Vaughn ........................ | 53/431 |
| 3,763,622 A | * | 10/1973 | Stanley, Jr. .................. | 53/431 |
| 3,804,077 A | * | 4/1974 | Williams .................... | 126/263.1 |
| 4,178,727 A | * | 12/1979 | Prusinski et al. ........... | 52/173.3 |
| 4,548,852 A | * | 10/1985 | Mitchell ..................... | 426/111 |
| 5,035,230 A | * | 7/1991 | Steidl et al. ............. | 126/263.08 |
| 5,275,156 A | * | 1/1994 | Milligan et al. ........ | 126/263.04 |
| 5,478,988 A | * | 12/1995 | Hughes et al. .............. | 219/730 |
| 5,551,213 A | * | 9/1996 | Koelsch et al. .............. | 53/434 |
| 5,711,136 A | * | 1/1998 | Carcano ....................... | 53/434 |
| 5,984,953 A | * | 11/1999 | Sabin et al. ................. | 607/114 |
| 6,116,231 A | * | 9/2000 | Sabin et al. ............ | 126/263.01 |
| 6,513,516 B1 | * | 2/2003 | Sabin et al. ............ | 126/263.01 |
| 6,550,223 B1 | * | 4/2003 | Xiong et al. ................. | 53/434 |

FOREIGN PATENT DOCUMENTS

EP    0 914 399 B1    5/1999

* cited by examiner

*Primary Examiner*—Louis Huynh
(74) *Attorney, Agent, or Firm*—Nixon Peabody LLP; David S. Safran

(57) ABSTRACT

A process for delivering a cold or heat storage medium into a carrier material, in which the carrier material is located in a container which can be at least partially evacuated. The process includes the steps of:
- a) placing the carrier material in a container made of film material,
- b) at least partially evacuating the container made of film material, and
- c) delivering cold or heat storage medium to the at least partially evacuated container made of film material so as to saturate the carrier material with the cold or heat storage medium.

19 Claims, 1 Drawing Sheet

PROCESS FOR DELIVERING A COLD OR HEAT STORAGE MEDIUM INTO A CARRIER MATERIAL

BACKGROUND OF THE INVENTION

1. Field of the Invention

The invention relates to a process for delivering a cold or heat storage medium into a carrier material in which the carrier material for delivering the cold or heat storage medium is located in a container that can be at least partially evacuated.

2. Description of Related Art

Generic processes make it possible to produce cold or heat accumulators with which thermal energy can be stored. These accumulators can be used, for example, in conjunction with the climate-control of motor vehicles.

The known generic processes call for the carrier material to be located in a strong container which can be evacuated by a vacuum pump (autoclave). After evacuation, the generally liquid cold or heat storage medium from a storage vessel is introduced into the strong container such that the container is filled with the cold or heat storage medium. Generally, the carrier material is immersed completely into the cold or heat storage medium. One such process is known, for example, from published European Patent Application No. EP0 914 399 B1.

However, the known generic processes have a series of disadvantages. For example, it is expensive to provide a container which can be at least partially evacuated in an autoclave. Furthermore, monitoring of the charging of the carrier material with the cold or heat storage medium when using an autoclave is generally not continuously possible, so that the known generic processes must often be carried out discontinuously. In particular, when the carrier material must be removed from the autoclave once or repeatedly to check current charging with the cold or heat storage medium, the storage medium can be lost.

SUMMARY OF THE INVENTION

A primary object of the present invention is to develop the generic process that can be carried out more efficiently, and thus, more economically.

The process of the invention comprises the following steps:
 a) placing the carrier material in a container made of film material,
 b) at least partially evacuating the container made of film material with an evacuation means, and
 c) delivering cold or heat storage medium to the container made of film material with a filling means.

This procedure makes it possible to abandon use of an autoclave for producing a vacuum since the area to be evacuated is bordered or made available by the container made of film material. Preferably, the carrier material even after charging with the cold or heat storage medium remains in the container of film material in order to be able to reliably prevent loss of the cold or heat storage medium. The film material, preferably formed from plastic, can thus perform two functions, specifically making available or limiting the area which is to be evacuated, and preventing losses of storage medium after the filling process. Placing the carrier material in the container made of film material according to process step a) can take place in any suitable manner. For example, the carrier material can be located in an already at least partially prefabricated container or the container can be formed around the carrier material, for example by suitable folding and welding of the film material.

In one preferred embodiment of the process of the invention, the container made of film material is formed by a film tube or a film bag. Film tubes or film bags are commercially available ready-made, and the use of prefabricated film tubes or film bags serves to simplify the execution of the process of the invention in many cases. As mentioned, the film tubes or film bags however can also be formed during or by the execution of process step a).

In the process of the invention, it is also preferable that the evacuation device is coupled to the open end of the container made of film material. The evacuation means can be, for example, a vacuum pump which has a suitable coupling means for coupling the open end of the container made of film material. The coupling means can be formed, for example, by a connecting piece via which the open end of the film tube can be pulled while sealing.

Similarly, in the process of the invention, it is preferable that the filling means is coupled to one open end of the container made of film material. If the container made of film material is formed by a film tube, especially preferred embodiments are possible in which one open end of the film tube is coupled to the evacuation means and the other open end of the film tube is coupled to the filling means. If the container made of film material is formed by a film bag, other preferred embodiments are possible in which the evacuation means and the filling means are coupled at the same time or in the form of a combination means to the single open end of the film bag.

For certain embodiments of the process of the invention, steps b) and c) are carried out at least partially at the same time. In this embodiment, filling is preferably only begun when evacuation is at least already partially completed. Simultaneous evacuation and filling when using film tubes are especially desired because the carrier material is preferably located between the evacuation means and the filling means so that direct intake of the cold or heat storage medium by the evacuation means can be avoided.

Alternatively, embodiments of the process of the invention are possible in which steps b) and c) are carried out in succession. This approach is especially suited when using film bags since the inlet of the evacuation means and the outlet of the filling means are often located adjacent to one another, such that, with simultaneous evacuation and filling, under certain circumstances, parts of the cold or heat storage medium could be undesirably taken by the evacuation means. Therefore, steps b) and c) are also carried out in succession when the evacuated container made of film material is sealed tight before the carrier material is charged with the storage medium.

Depending on the embodiment, it is preferred for the process of the invention that one or more open ends of the container made of film material are sealed tight after carrying out step b) or c), especially by welding. In doing so, the sealing of the open end or ends after carrying out process step c) is particularly desired when the evacuation means and/or the filling means are coupled to one open end of the container made of film material. Sealing of the open end or ends after carrying out process step b) is especially possible when the carrier material is not filled with the storage medium via the open end of the container made of film material as, for example, in the embodiment explained below.

The invention furthermore comprises embodiments of the process in which the filling means has at least one injection needle with which the container made of film material is punctured for delivering the cold or heat storage medium. As a result of the negative pressure prevailing within the container made of film material, the storage medium is taken, for example, via the injection needle(s) until saturation of the carrier material. Preferably, the injection needle sealing system ensures that intake of air or foreign substances at the puncture site is avoided.

In all embodiments of the process of the invention, it is preferred that the weight of the carrier material is determined before carrying out step c). This weight determination is desirable in order to be able to ensure a defined degree of filling of the carrier material with the cold or heat storage medium in downstream working processes is performed in a controlled manner, e.g., until saturation of the carrier material.

Especially preferred is that there is a defined amount of the cold or heat storage medium in the carrier material.

For this purpose, the process of the invention can provide that a defined amount of the cold or heat storage medium is provided by a filling means which functions as a metering means. For example, the carrier material can be weighed before filling, which enables the amount of cold or heat storage medium necessary for saturation of the carrier material to be determined. Then, exactly that amount can be supplied via the metering means. The metering unit can comprise, for example, a metering cylinder and/or a volumetric flow counter which is coupled to a shutoff valve. The desired degree of filling can thus be ensured within the tolerances of the metering means.

Furthermore, in the process of the invention, it can be provided that a defined amount of cold or heat storage medium is provided by the carrier material first being overfilled with the cold or heat storage medium and then a drying process being carried out until the defined amount of cold or heat storage medium is reached. This approach is particularly desirable when the container made of film material is sealed tight only after carrying out the process step c). The carrier material is weighed preferably before and after filling with the cold or heat storage medium. Since the sum of the weight of the carrier material and the weight of the cold or heat storage medium is a function of the degree of filling, the degree of filling can be exactly determined via weight measurement. The overfilled unit can be dried for example with hot air with continuous weighing until the total weight corresponds to the required degree of filling.

The process of the invention can also provide for a defined amount of cold or heat storage medium to be provided by first overfilling the carrier material with the cold or heat storage medium and then exhausting the cold or heat storage medium until the defined amount of the cold or heat storage medium is reached. In this embodiment, excess cold or heat storage medium is preferably exhausted until the total weight of the unit corresponds to the required degree of filling.

In particularly preferred embodiments of the process of the invention, the carrier material is formed by a matrix, especially a graphite matrix. In that instance, the carrier material can be, for example, in plate form or in the form of a package of plates.

Furthermore, it is preferred for the cold or heat storage medium to be formed by a phase changing material, for example by water or paraffin. Of course, other phase changing materials which are well known to one skilled in the art are possible.

DETAILED DESCRIPTION OF THE INVENTION

Figure 1:
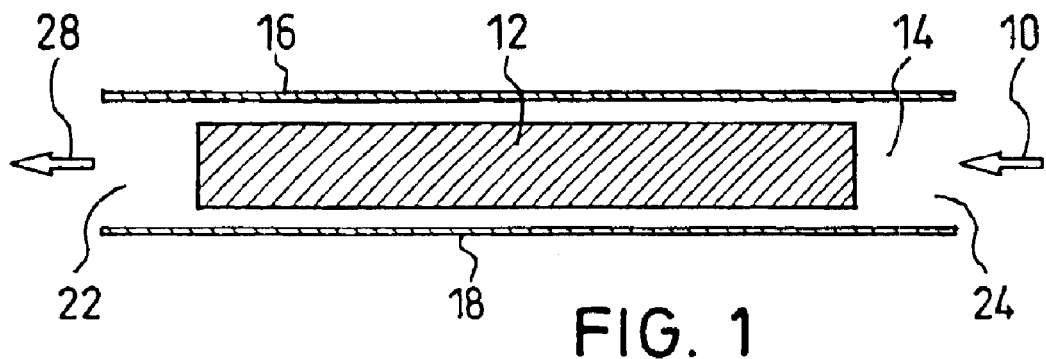
FIG. 1 is a schematic illustration of the first embodiment of the process of the invention.

FIG. 1 illustrates a first embodiment of the process of the invention in which a container 14 made of film material 16 is formed by the film tube 18. The film tube 18 has a first open end 22 and a second open end 24. An evacuation means for exhausting air 28 out of the container 14 is coupled to the first open end 22. A filling means (not shown) is coupled to the second open end 24 of the film tube 18 in order to supply the cold or heat storage medium 10 to the carrier material 12 located in the film tube 18 in the form of a graphite matrix. After producing a vacuum within the container 14 made of film material 16, the storage medium 10 is preferably metered depending on the weight of the carrier material. Then the two open ends 22, 24 of the film tube 18 are sealed. Sealing takes place preferably by welding, for example, by using a heating wire or some other suitable heat source.

Figure 2:
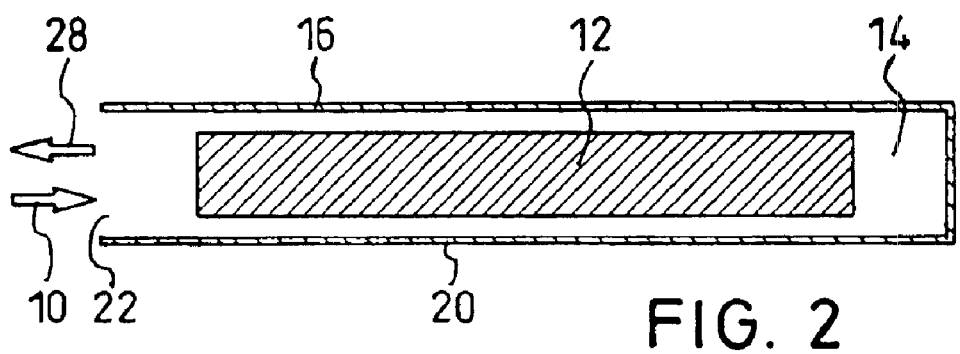
FIG. 2 is a schematic illustration of a second embodiment of the process of the invention.

FIG. 2 illustrates a second embodiment of the process of the invention in which the container 14 made of film material 16 is formed by a film bag 20. Similarly to the first embodiment, the carrier material 12 is located in the container 14. Then, a combination device (not shown) which forms the evacuation means and the filling means is coupled to the open end 22 of the film bag 20. Within the container 14 a vacuum is produced by exhausting the air 28. Then, the cold or heat storage medium 10 is supplied. The desired degree of filling can be ensured in this embodiment, as well as that illustrated in FIG. 1, by supplying the cold or heat storage medium 10 metered beforehand in the correct amount, by the carrier material 12 being first overfilled with cold or heat storage medium 10 and then a drying process being carried out, or by the carrier material 12 first being overfilled with the cold or heat storage medium 10 and then the cold or heat storage medium 10 being removed until the desired degree of filling is reached.

Figure 3:
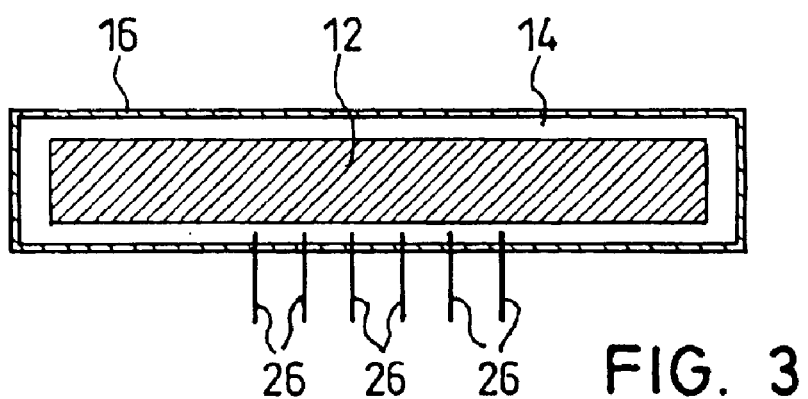
FIG. 3 is a schematic illustration of a third embodiment of the process of the invention.

FIG. 3 shows a third embodiment of the process of the invention. In this embodiment, the carrier material 12 is first located in a container 14 made of film material 16 and the container 14 is evacuated. Then, the container 14 made of film material 16 is sealed tight, for example, by welding. A filling means which in this case has several injection needles 26 is coupled to the evacuated carrier material package 12 which has been packed in the film material 16. The injection needles 26 are preferably connected to the filling means to function as a metering means. The injection needles 26 puncture the film material 16 and thus create a connection of the evacuated space to the cold or heat storage medium. Based on the negative pressure which prevails within the evacuated container 14, the cold or heat storage medium is injected, via the injection needles 26, into the carrier material until the carrier material is saturated. In this embodiment, it is preferably ensured that, when the injection needles 26 puncture the film material 16, no air or foreign material is introduced into the sealed film material 16 via the puncture sites. For this reason, there can be an additional injection needle sealing system, if necessary.

In all embodiments of the process of the invention, a graphite matrix can be advantageously used as the carrier material 12, and the cold or heat storage medium 10 can be formed, for example, by water or paraffin.

The features of the invention disclosed in the description above and in the drawings can be important both individually and also in any combination for the implementation of the invention.

What is claimed is:

1. Process for delivering a cold or heat storage medium into a carrier material located in a container which can be at least partially evacuated, comprising the steps of:
   a) placing the carrier material in the container, wherein the container is composed of a film material,
   b) at least partially evacuating the container with an evacuation means, and
   c) saturating the carrier material with the cold or heat storage medium by delivering, with a filling means, the cold or heat storage medium into the at least partially evacuated container to introduce the cold or heat storage medium into the carrier material.

2. Process of claim 1, wherein the container of film material is formed in the shape of a film tube or a film bag.

3. Process of claim 1, wherein the evacuation means is coupled to an open end of the container of film material.

4. Process of claim 1, wherein the filling means is coupled to an open end of the container made of film material.

5. Process of claim 1, wherein steps b) and c) are carried out at least partially at the same time.

6. Process of claim 1, wherein steps b) and c) are carried out successively.

7. Process of claim 1, wherein the container of film material has at least one open end and the at least one open end of the container of film material is sealed after carrying out either of steps b) and c).

8. Process of claim 7, wherein the at least one open end of the container of film material is sealed tight by welding.

9. Process of claim 1, wherein the filling means comprises at least one injection needle which delivers the cold or heat storage medium into the container of film material by puncturing the container of film material.

10. Process of claim 1, wherein the weight of the carrier material is determined prior to carrying out step c).

11. Process of claim 1, wherein, after filling the container of film material with the cold or heat storage medium, a predefined amount of the cold or heat storage medium is present in the carrier material.

12. Process of claim 11, wherein the predefined amount of the cold or heat storage medium is provided by a filling means which includes a metering means.

13. Process of claim 11, wherein the predefined amount of the cold or heat storage medium is provided by overfilling the container of film material with the cold or heat storage medium and subsequently carrying out a drying process until the predefined amount of cold or heat storage medium is reached.

14. Process of claim 11, wherein the predefined amount of the cold or heat storage medium is provided by overfilling the container of film material with the cold or heat storage medium and subsequently exhausting the container of film material until the predefined amount of the cold or heat storage medium is reached.

15. Process of claim 11, wherein the filled container is sealed with said predefined amount of the cold or heat storage medium present in the carrier material.

16. Process of claim 1, wherein the carrier material is a matrix material.

17. Process of claim 16, wherein the matrix material is a graphite matrix.

18. Process of claim 1, wherein the cold or heat storage medium is a phase changing material.

19. Process of claim 18, wherein the phase changing material is water or paraffin.

* * * * *